(12) United States Patent
Haimer (10) Patent No.: US 8,322,258 B2
(45) Date of Patent: Dec. 4, 2012

(54) TOOL HOLDER

(75) Inventor: Franz Haimer, Igenhausen (DE)

(73) Assignee: Franz Haimer Maschinenbau KG (DE)

( * ) Notice: Subject to any disclaimer, the term of this patent is extended or adjusted under 35 U.S.C. 154(b) by 505 days.

(21) Appl. No.: 12/531,282

(22) PCT Filed: Mar. 13, 2008

(86) PCT No.: PCT/EP2008/002019
§ 371 (c)(1),
(2), (4) Date: Nov. 25, 2009

(87) PCT Pub. No.: WO2008/110370
PCT Pub. Date: Sep. 18, 2008

(65) Prior Publication Data
US 2010/0061820 A1   Mar. 11, 2010

(30) Foreign Application Priority Data
Mar. 15, 2007   (DE) .......................... 10 2007 012 487

(51) Int. Cl.
*B23B 3/06*   (2006.01)
*B23B 29/24*   (2006.01)
(52) U.S. Cl. .......................................... 82/155; 407/67
(58) Field of Classification Search .............. 407/67; 82/155, 158, 160, 161; 409/234, 231, 232
See application file for complete search history.

(56) References Cited

U.S. PATENT DOCUMENTS

| | | | |
|---|---|---|---|
| 3,719,367 A * | 3/1973 | Baturka | 279/145 |
| 4,604,010 A | 8/1986 | Reeves | |
| 4,621,960 A | 11/1986 | Tollner | |
| 4,906,147 A * | 3/1990 | Friesinger et al. | 409/232 |
| 7,513,724 B2 * | 4/2009 | Kakai | 409/234 |
| 2005/0089382 A1 | 4/2005 | Stojanovski | |
| 2005/0095076 A1 | 5/2005 | Pantzar | |
| 2007/0251068 A1 * | 11/2007 | Stojanovski | 29/33 K |
| 2010/0303572 A1 * | 12/2010 | Sturm | 409/234 |

FOREIGN PATENT DOCUMENTS

| | | |
|---|---|---|
| DE | 876793 C | 5/1953 |
| DE | 3314591 | 10/1984 |
| DE | 8706214 U1 | 8/1988 |
| DE | 9107604 | 8/1991 |
| DE | 10114240 | 1/2003 |
| DE | 10360939 A1 | 12/2004 |
| DE | 102004019869 | 8/2005 |
| DE | 102004054550 A1 | 5/2006 |
| WO | WO 02/076661 | 10/2002 |

OTHER PUBLICATIONS

International Preliminary Report on Patentability for International (PCT) Application No. PCT/EP2008/002019, Issued Oct. 6, 2009.
International Search Report issued by the European Patent Office on Jun. 12, 2008, for International Application No. PCT/EP2008/002019.

* cited by examiner

*Primary Examiner* — Will Fridie, Jr.
(74) *Attorney, Agent, or Firm* — Sheridan Ross P.C.

(57) ABSTRACT

The present invention relates to a tool holder (1) that either has a modular design, and the modules of which are centered via interfaces, or/and in which a centered interface (9) is provided between the tool (5) and the tool receiver (4) such that high concentricity, and thus a high processing accuracy are achieved. The present invention further relates to a system comprising a tool holder (1) and a tool (5).

24 Claims, 12 Drawing Sheets

TOOL HOLDER

CROSS REFERENCE TO RELATED APPLICATIONS

This application is a national stage application under 35 U.S.C. 371 of PCT Application No. PCT/EP2008/002019 having an international filing date of 13 Mar. 2008, which designated the United States, which PCT application claimed the benefit of German Application No. 102007012487.4 filed 15 Mar. 2007, the entire disclosure of each of which are hereby incorporated herein by reference.

The present invention relates to tool holders for tools, in particular for drilling-, turning-, milling-, reaming- or grinding tools according to the preambles of the patent claims 1 and 23, and it relates to a system comprised of such tool holders and of a tool according to the preamble of patent claim 24.

Such tool holders are comprised of a coupling shaft, e.g. a hollow conical shaft or a steep conical shaft, for coupling the tool holder to a machine tool and to a tool receiver.

One-piece tool holders are known and also modular or multi-piece tool holders, in which the tool receiver can be disengaged from the coupling shaft. Modular tool holders allow the use of various tools on a single coupling shaft, which reduces cost.

The problem with such modular tool holders, however, is that eccentricities are created, when the tool receiver is not exactly aligned to the rotation axis of the coupling shaft. These eccentricities prevent a high level of high precision, and thus exactness and reproducibility, when machining work pieces. Additionally, the eccentricities can cause the tool holder to vibrate, which degrades the machining precision even further. The same problem, however, also occurs with non-modular tool holders in which a tool is received.

In order to increase machining precision, a modular tool holder is proposed in DE 33 14 591 C2, in which a centering interface is provided between the tool holder and the coupling shaft, wherein said interface is formed by one or plural support surface sections of the chuck, which is connected to the coupling shaft through a center component, wherein said support surface sections are supported at one or plural opposite surface sections of the tool receiver. Thus, the tool receiver comprises a centering pin, which can be inserted into a conical receiver bore hole in the chuck, and can be centered and axially clamped through an elastic deformation of the centering pin configured with a smaller cone angle. Through the cone angle of the centering pin, a radial clamping is simultaneously performed, which acts inward, this means it compresses the centering pin at least partially. The clamping force is thus caused by a bolt, which engages an inner thread of the centering pin, which is coaxial with the rotation axis of the tool holder.

It is a disadvantage of said tool holder that the elastically deformable centering elements require very high manufacturing complexity, since said surfaces are only deformable to a very minor extent. This makes such tool holders very expensive. Furthermore, the deformable centering pin with the inner bore hole only comprises a very small material thickness compared to the total diameter of the tool holder, which can cause material fatigue and fracture at this spot.

It is the object of the present invention to provide a tool holder, which is simple and cost effective to produce, while still facilitating sufficient centering, so that eccentricity errors are avoided as much as possible. In particular, said tool holder shall also be configured modular.

This object is accomplished by tool holders according to patent claims 1 and 23, and by a system made of such tool holders and a tool according to patent claim 24, wherein advantageous embodiments are respective objects of the dependent patent claims.

The invention is based on the idea that a centering through elastic deformation of a pin, which is also used for connecting particular modules of the tool holder, is detrimental.

Instead, it is suggested to provide a centering interface between the tool holder and the tool, wherein said interface is formed by one or plural support surface sections, which are integrally configured at the tool receiver and which are supported at one or plural opposite surface sections, which are integrally configured at the tool, and/or to dispose a centering interface at least between two modules of the tool holder, which are disengageable from one another, like e.g. chuck and tool receiver, wherein said centering interface is formed by one or plural support surface sections of the module more proximal to the coupling shaft, wherein said support surface sections are supported at one or plural opposite surface sections of the module, which is adjacent with reference to the longitudinal axis of the tool holder, and further remote from the coupling shaft. Thus, the interface shall be configured, so that the tool is not radially clamped with reference to the tool receiver, or at least radially clamped towards the outside, or the module further remote from the coupling shaft with reference to the longitudinal axis of the tool holder is not clamped radially, or at least clamped radially to the outside, relative to the adjacent module, which, however, is more proximal to the coupling shaft.

In the context of the present invention, an interface is a machine interface, which is defined by a separation plane, perpendicular to the longitudinal axis of the tool holder, wherein support surface sections and opposite surface sections are either in direct contact with one another and/or the support is performed by an additional intermediary element, e.g. a centering ring. Such an intermediary element, however, is limited in such an interface to a relatively small portion in axial direction, so that in particular, clamping sleeves as illustrated in DE 10 2004 019 869 A1 in FIG. 7 with the reference numeral 620 are not considered as such an intermediary element of an interface. It holds in particular in the context of the present invention that the intermediary element only extends over such a narrow axial portion, which is narrower than the axial portion of the connection, e.g. of the threaded connection, of the two modules at the interface itself, so that the connecting element primarily also does not cover the axial connection portion on both sides. However, such clamping assemblies can certainly be provided in addition to the interface(s) according to the invention in a tool holder according to the present invention.

In a radially non-clamped centering, substantially no elastic deformation in radial direction occurs, while in a radially outward facing clamping, a centering element engages a module or the tool, and thus establishes a radially outward acting pressure upon said module or tool. This way, no centering pin is required, which due to its small base width, which, however, has to bear high loads, has to be fabricated very stable, this means with thick walls, but simultaneously also very precisely, but a thin walled configuration of the opposite wall sections of the interface suffices. Through said thin walled configuration as a matter of physics, elasticity is provided, so that the centering elements, at which the opposite surface sections are disposed, are resilient over a wide range, and can thus be fabricated with relatively large tolerances.

When the connection between the modules or the tool and the tool receiver is disposed in the portion of the interface, the modules or the tool can also be configured very short.

Advantageously, at least one support surface section extends with reference to the radius of the tool holder at an angle greater than 0° and less than 180° relative to the longitudinal axis, and is in direct contact with one of the opposite surface sections of the interface.

In a preferred embodiment, the tool holder is configured modular, so that the chuck and the tool receiver form modules, which are disengageable from one another. With this configuration, a very cost effective modular tool holder is provided, which can be flexibly adapted over a wide range of applications.

When additional flexibility with respect to the application ranges is required, the base body of the tool holder, which is comprised of the coupling shaft and the center portion, and the chuck form independent modules, which can be connected with one another according to another preferred embodiment. Between the center portion and the chuck, then preferably also a centering interface is provided. Preferably, a threaded connection is provided as a connection. The connection between the center portion and the chuck is advantageously disposed in the portion of said interface.

Through said additional modular structure of the tool holder, it can e.g. be adapted even better to different tool diameters, since now a proper tool receiver can be provided for each tool diameter in a chuck adapted thereto, which is disposed at a standardized tool holder base body. Thus, furthermore, also different requirements with respect to the distance of the tool from the coupling plane of the tool holder in the machine tool can be accommodated through chucks with different lengths. Certainly, also the center component can be configured as a module, which is disengageable from the clutch shaft, or the tool holder is exclusively comprised of the modules chuck and center component, which are configured disengageable from one another.

Eventually, flexibility can be increased even further, when the chuck is configured from particular modules and preferably comprises additional centering interfaces, wherein the modules of the chuck are directly connected, so that they are disengageable from one another.

In a preferred embodiment, the centering is performed proximal to the outer diameter of the tool holder, and thus, in particular, with respect to the radius of the tool holder at the interface between the half radius and the outer diameter of the tool holder. This way, a greater material thickness can be provided for the connection element or for the tool receiver, compared to what is possible with a centering pin. Thereby, the tool holder is less susceptible to material fatigue.

Advantageously, a planar seat is provided in the interface proximal to the outer diameter of the tool holder, in particular with reference to the radius of the tool holder at the interface between the half radius and the outer diameter of the tool holder, wherein the planar seat surface is formed between contact surfaces extending orthogonal to the rotation axis of the tool holder. It is then assured that the basis of the axial clamping at the interface is as wide as possible, which improves the vibration resistance. The planar seat surface allows the transfer of maximum axial clamping forces at the interface.

A conical seat surface can also be provided proximal to the outer diameter of the tool holder, in particular with reference to the radius of the tool holder at the interface between the half radius and the outer diameter of the tool holder, which then also facilitates a maximum flexibility of the material at the interface, also in conjunction with radial clamping, which reduces manufacturing cost due to allowing a higher tolerances within the interface.

The support surface section advantageously comprises the shape of a conical annular surface, wherein also another support surface section can be provided, which is configured as an opposed annular surface. The support surface section reaches behind the opposite surface section at least partially. The conical annular surface can thus also be configured concave or convex, wherein the opposite surface section is then configured convex or concave.

Alternatively, the support surface section at an interface can comprise the shape of a semispherical ring groove, and the opposite surface section can be configured by a semispherical annular protrusion, or the opposite surface section can comprise the shape of a semispherical ring groove, wherein then balls are disposed between the support surface section and the opposite surface section. Through such ball support of the interface, an azimuth orientation of the tool about the longitudinal axis of the tool holder can be adjusted in a simple reduced friction manner before the axial clamping is fixated.

Furthermore, a centering ring can be advantageously disposed between the support surface section and the opposite surface section, by means of which, a very defined setting of the radial and axial clamping can be adjusted. The centering ring can particularly comprise a circular cross section, wherein the support surface section and the opposite surface section then comprise the shape of a semispherical ring groove. The centering ring can also comprise a diamond shaped cross section, wherein the support surface section and the opposite surface section are then respectively formed by two conically opposed annular support surfaces.

It is appreciated in general that the opposed configuration of the support surface sections, e.g. in the form of the opposed conical annular surfaces or semispherical surface described supra, the opposed surface sections are guided very precisely, which increases the centering precision.

With these centering elements (conical annular surfaces; semispherical annular protrusion—semispherical ring groove; semispherical ring grooves—balls or centering ring; opposed conical annular support surfaces—diamond shaped centering ring) unclamped centering can be accomplished by adapting the support surface sections and the opposite surface sections with respect to their dimensions, so that in axially clamped conditions of the modules relative to one another no radial clamping exists, and also e.g. in the tool receiver, at least a radially outward oriented clamping can be adjusted by sizing the opposite surface sections of the tool receiver slightly smaller with respect to the support surface sections, so that they are radially preloaded in axially clamped condition relative to the support surface sections.

For vibration damping of the tool holder, advantageously at least in a portion of the interface between the support surface- and opposite surface sections of the interface, a vibration damper is disposed. It is preferably configured as a ring made of a soft material, like e.g. plastic or lead, and disposed in a recess in the flat contact surface, so that it cannot be pressed out in lateral direction. Alternatively, the ring can also be made of a high strength material like steel, ceramic, copper or brass or similar as a vibration damper. Then said ring does not have to be received in a recess, but can be disposed laterally.

The interface preferably comprises a rotation safety. This assures, on the one hand, that e.g. a threaded connection at an interface is not overloaded during the machining of the work piece, and, on the other hand, that a machining of the work piece is possible in both rotation directions of the tool holder, thus e.g. the tool receiver is not rotated out of the chuck.

For optimum torque transfer, the interface of the tool holder comprises a polygon contour, which simultaneously also acts as a rotation safety. Hereby, a rotation of the modules relative to one another under load effect is effectively prevented.

In a particularly preferred manner, the disengageable connection at an interface is a threaded connection, wherein at least one module or the tool comprises a receiver bore hole, which engages an outer thread in a form locking manner. Such a threaded connection can be provided in a particularly simpler manner.

In such a threaded connection, the outer thread can be disposed on a freely rotatable cylinder bolt, which contacts the other module or the tool axially with its head. Or the outer thread can be disposed at a threaded pin, which comprises another outer thread, which engages the inner thread of a receiver bore hole in the other module or in the tool in a form locking manner. Then advantageously, the outer thread of the threaded pin runs in opposite direction at a different pitch, runs in opposite direction with the same pitch, or runs in the same direction with a different pitch.

However, also a friction locked connection, thus e.g. a clamped connection, can be provided. Herein a clamping system comprising a tension piece with a tension disk and an expanded head collet is provided, wherein the expanded head collet clamps a module relative to the other module of the interface through the tension disk, when the tension piece is actuated. Advantageously, the tension piece can be configured, so it can be actuated through the engagement of the coupling shaft, wherein in particular, an outer thread configured at the tension piece engages a respective inner thread, which is in operative engagement with the coupling shaft. Alternatively, the tension piece can also be configured through engagement along or transversal to the tool holder longitudinal axis, and actuatable by the tool, wherein in particular, a pressure piece is provided, which actuates the tension disk, and the pressure piece is actuated by a clamping bolt.

Thus, through the centering interface according to the invention, not only the particular modules of the tool holder, which can be disengaged from one another, can be clamped in a very precisely centered manner, but also a centering between tool and tool holder is provided, wherein in this case, the tool holder itself does not have to be configured in a modular manner, but can be substantially configured in one piece, this means the modules, coupling shaft, center piece, chuck and tool receiver of the tool holder base body are not configured disengageable from one another, and at this tool holder base body in particular, no clamping assembly is provided either, which causes a clamping of the chuck relative to the tool holder base body. In this context, a substantially one-piece tool holder is a tool holder, which, in particular, does not comprise such a clamping assembly, which at least during operation of the tool holder in an axial clamping section of the chuck imparts a clamping force with a clamping force component, acting in axial direction, and comprises one or plural support surface sections, at least at one side with reference to the tool holder longitudinal axis, which movably contact one or plural opposite surface sections of the tool holder base body formed by coupling shaft, center component, chuck and tool receiver, and which are supported relative to the above components through radial clamping.

In this context, independent protection is also claimed for a system made of a tool holder and a tool received therein, in which at least one interface is provided, which centers according to the invention.

Further particularities and advantages of the present invention will subsequently become evident from the description of the embodiments illustrated in the drawings.

FIG. 9a)-d) shows a sectional view of a detail of four alternative interface configurations;

Figure 1:
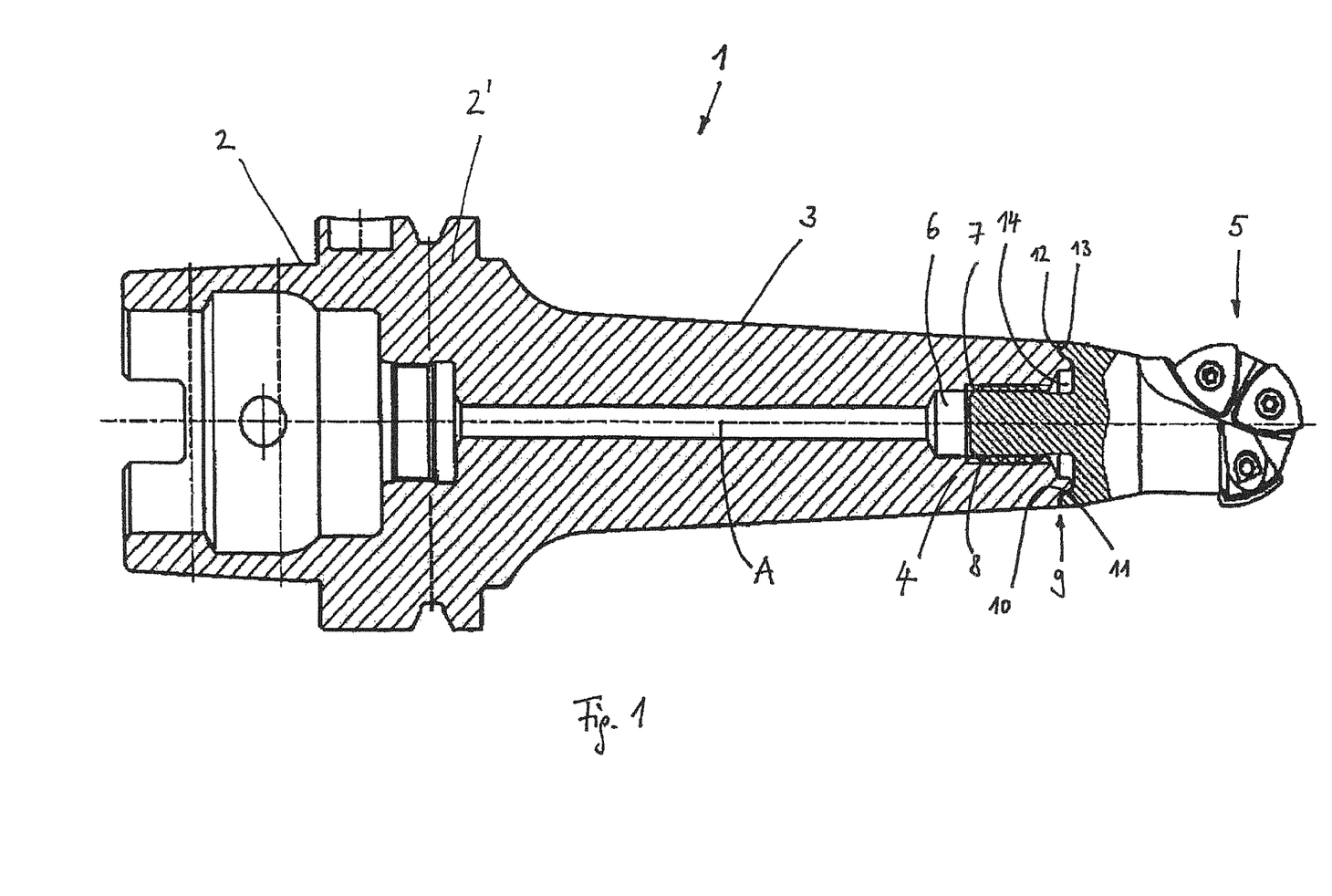
FIG. 1 shows a sectional view of a first embodiment of the tool holder according to the invention.

FIG. 1 shows a purely schematic illustration of a first embodiment of the tool holder 1 according to the invention. The tool holder 1 comprises a coupling shaft 2, configured as a hollow shaft coupling, a center component 2', a chuck 3 and a tool receiver 4, which are integrally connected amongst one another. In the tool receiver 4 a tool 5, more precisely a milling bit, is received. The tool receiver 4 comprises a receiver bore hole 6 with an inner thread 7, in which the outer thread 8 of a pinion of the tool 5 engages. Between the tool receiver 4 and the tool 5, an interface 9 is configured, which centers the tool 5 with reference to the longitudinal axis A of the tool holder 1.

The centering is thus performed through conical support surface sections 10 of the tool receiver 4, which can also be configured in a concave or convex manner, wherein opposite surface sections 11 of the tool 5 contact said support surface sections. The axial clamping of the tool receiver 4 and the tool 5 is performed through a planar seat between the support surface sections 12 and the opposite surface sections 13. The support surface sections 10 and the opposite surface sections 11 can be sized for the planar seat, so that no radial clamping is generated. Preferably, the support surface sections 10 and the opposite surface sections 11, however, are sized, so that the tool 5 is clamped in radial outward direction relative to the tool receiver 4, which facilitates an additional reduction of the vibration susceptibility of the tool holder 1.

Since the opposite surface sections 11 are disposed on the outside with reference to the outer diameter of the tool holder 1, and thus with reference to the radius of the tool holder 1 between the half radius and the outer diameter, the centering element of the tool 5, at which the opposite surface sections 11 are disposed, are configured relatively thin walled and thus elastic. Therefore, the support surface sections 10 and the opposite surface sections 11 can be fabricated with relatively large tolerances and thus in a relatively inexpensive manner, since the centering element of the tool 5 is resilient over a rather wide range. Said resiliency of the centering is even supported by the diameter of the receiver bore hole 6, which is enlarged in the front portion 14, whereby also the centering element of the tool receiver 4, at which the support surface sections 10 are disposed, are relatively thin walled and thus elastic.

Figure 2:
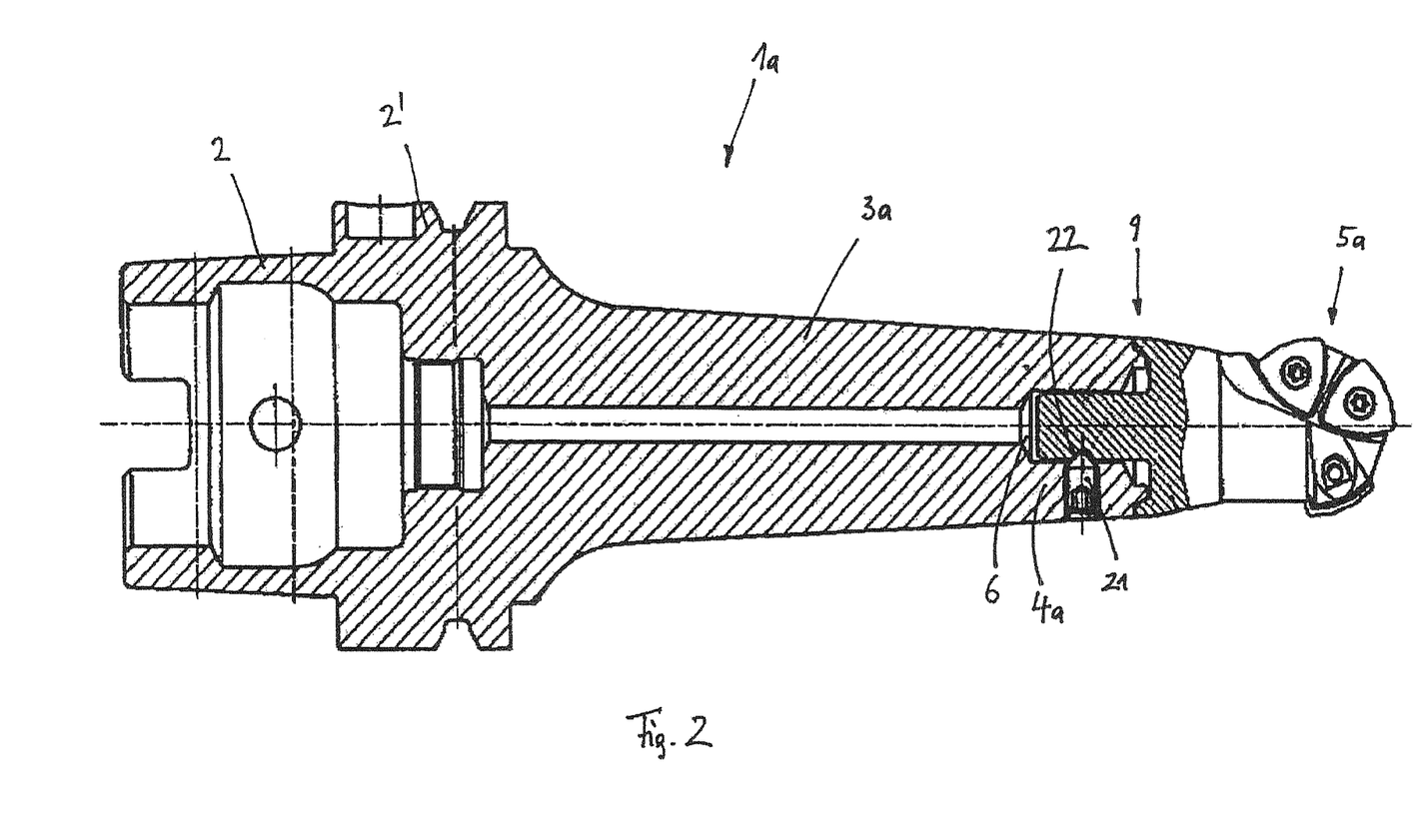
FIG. 2 shows a sectional view of a second embodiment of the tool holder according to the invention.

FIG. 2 shows a second embodiment of the tool holder 1a according to the invention in a purely schematic sectional view, wherein the same reference numerals are subsequently always used for the same elements. The tool holder 1a in turn is comprised of a one-piece tool holder base body, comprising the elements: coupling shaft 2, center portion 2', chuck 3a, and tool receiver 4a, wherein the tool receiver 4a does not have an inner thread in its receiver bore hole 6, but comprises a laterally guided threaded pin 21 with a cone, which can be inserted into a groove or radial depression 22 of a pinion of the tool 5a, in order to thus axially fixate the tool 5a in the tool receiver 4a. Between the tool receiver 4a and the tool 5a, in turn, a centering interface 9 is provided, which is configured as illustrated in FIG. 1.

Figure 3:
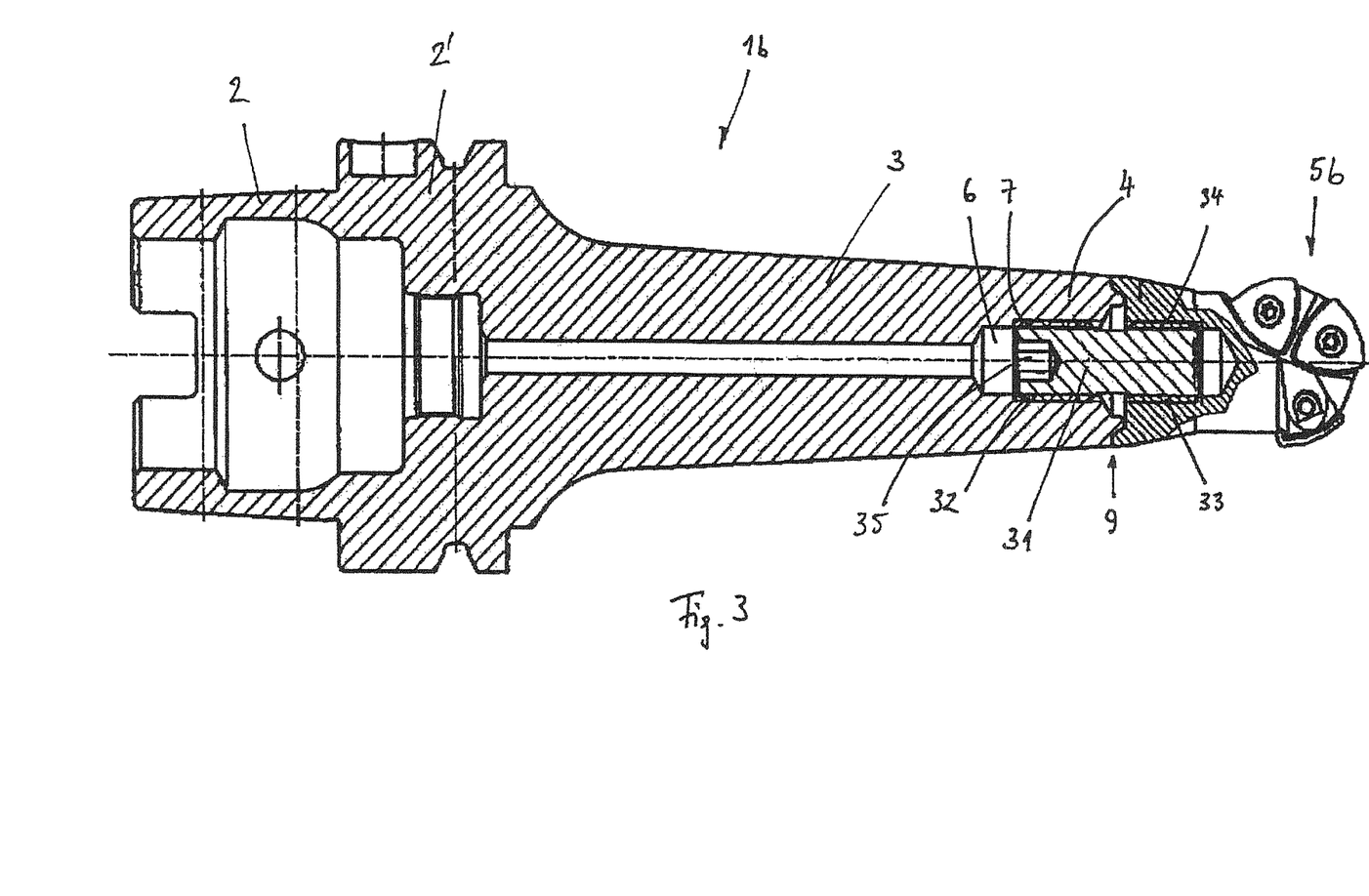
FIG. 3 shows a sectional view of a third embodiment of the tool holder according to the invention.

FIG. 3 schematically illustrates a sectional view of a third embodiment of the tool holder 1b according to the invention, wherein here the connection between the modules tool receiver 4 and tool 5b is established by a threaded pin 31, which is provided with two opposite outer threads 32, 33, which engage respective inner threads 7, 34 of the receiver bore hole 6, or of a receiver bore hole of the tool 5b. The connection of tool receiver 4 and tool 5b is performed at the interface 9 through screwing the threaded pin 31 in on both sides, which comprises a hexagonal recess 35 at its end on the clutch side. The outer threads 32, 33 of the threaded pin 31 have different pitch.

Figure 4:
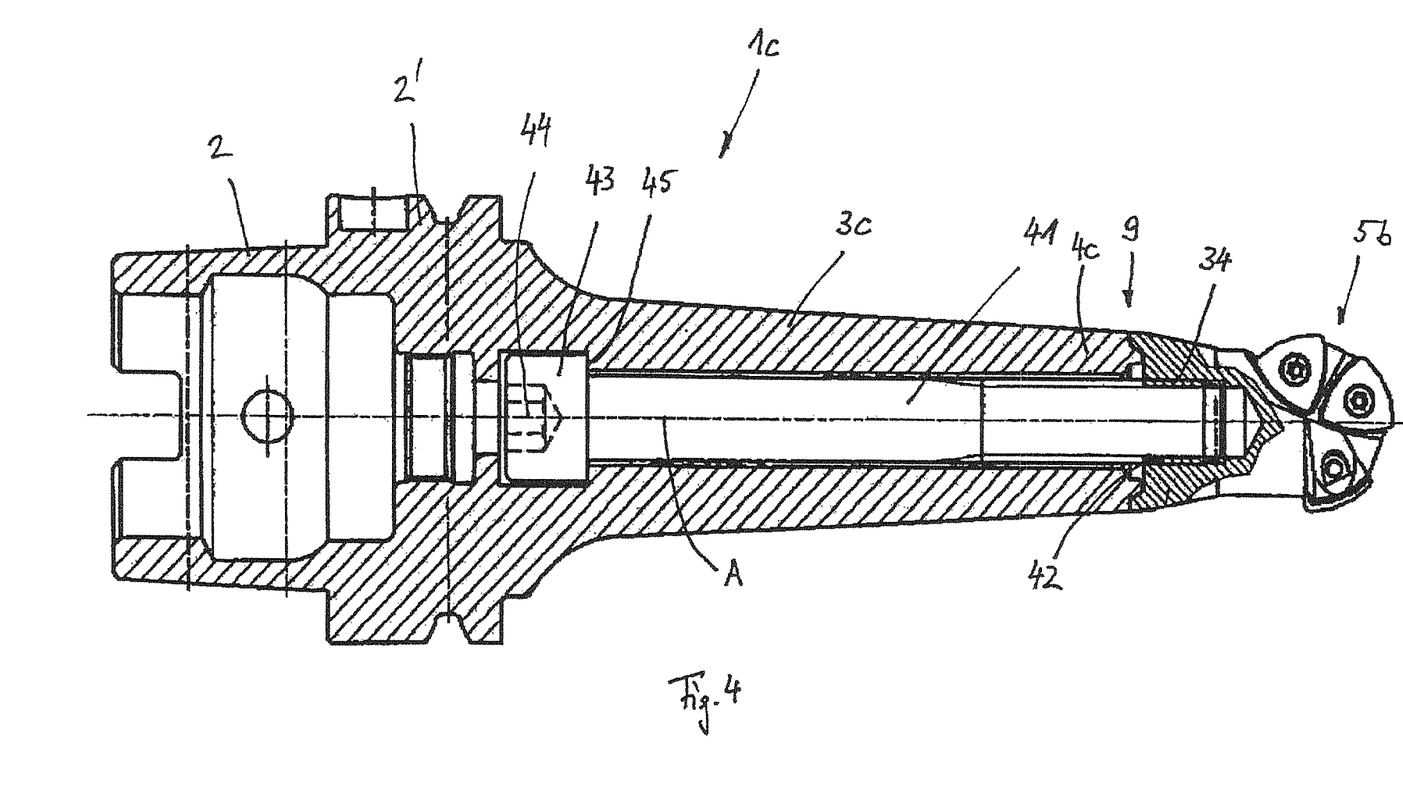
FIG. 4 shows a sectional view of a fourth embodiment of the tool holder according to the invention.

FIG. 4 schematically illustrates a sectional view of a fourth embodiment of the tool holder 1c according to the invention, wherein here the connection between the modules tool receiver 4c and tool 5b is implemented by a bolt 41, disposed along the longitudinal axis A of the tool holder 1c, wherein the outer thread 42 of said bolt engages the inner thread 34 of the receiver bore hole of the tool 5b. The head 43 of the bolt 41 is provided with a hexagonal recess 44 and contacts a protrusion 45 of the tool receiver 4c, so that the tool receiver 4c and the tool 5b can be clamped together in axial direction.

Figure 5:
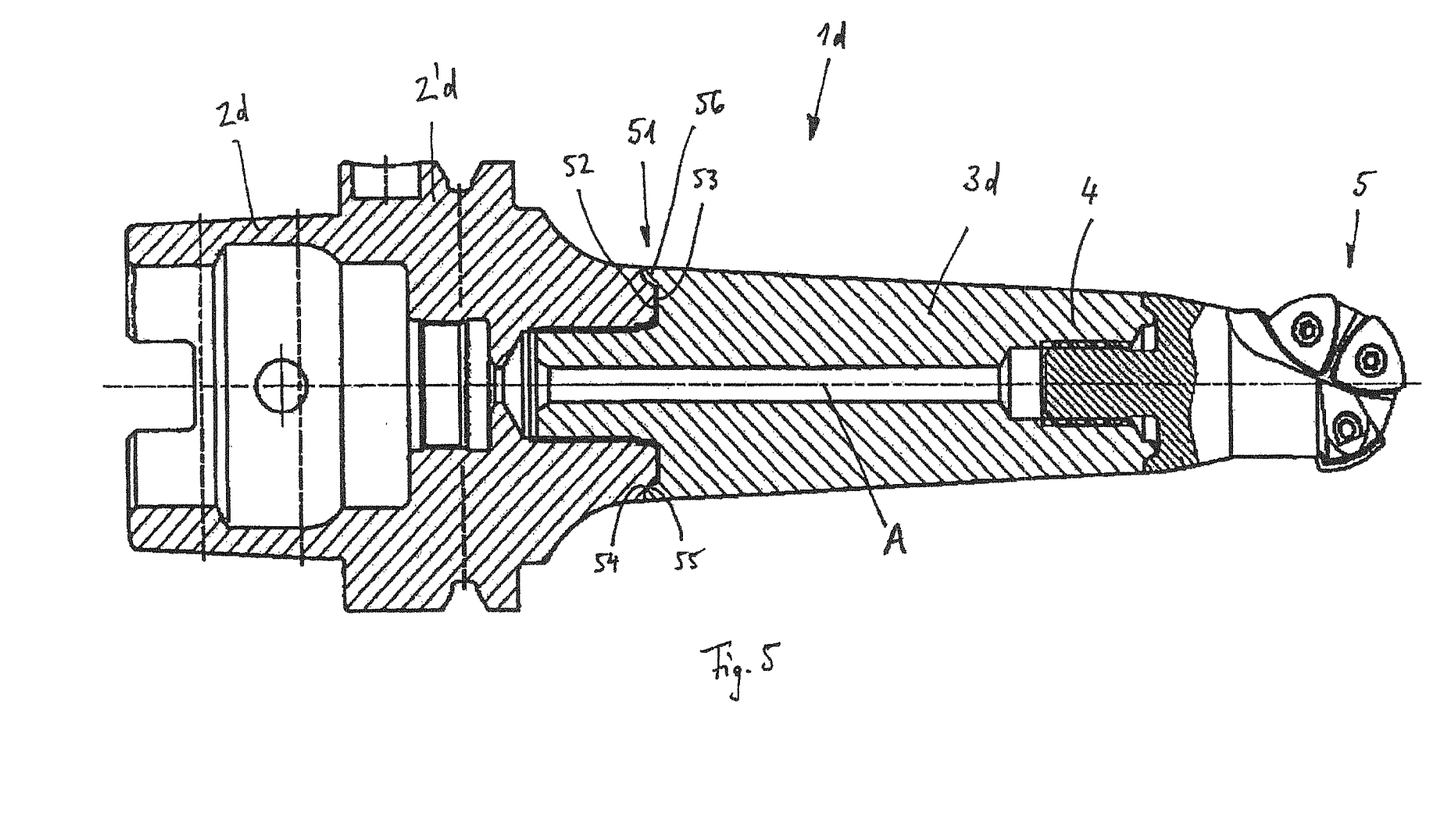
FIG. 5 shows a sectional view of a fifth embodiment of the tool holder according to the invention.

FIG. 5 illustrates a schematic sectional view of a fifth embodiment of the tool holder 1d according to the invention. This embodiment differs from the first embodiment in that the tool holder base body is not configured in one piece but, modular. Thus, the chuck 3d, which is integrally connected to the tool receiver 4, is disengageably connected to the center component 2'd and centered through an interface 51. Said interface 51 is substantially configured identical to the interface 9 between the tool receiver 4 and the tool 5, wherein, however, the planar seat between the support surface section 52 and the opposite surface section 53 with reference to the radius is disposed closer to the longitudinal axis A of the tool holder 1d, than the conical support surface sections 54 and the opposite surface section 55. Thereby, the centering element 56 of the chuck 3d also comprises sufficient flexibility in spite of the greater outer diameter of the tool holder 1d in the portion of the interface 51, while the center component 2'd is rather inflexible in the portion of the interface 51.

Through this particular configuration, various chucks 3d can be used in the tool holder 1d, which e.g. can comprise different length or width, or which can be adapted for receiving different tool receivers. Additionally, certainly also the chuck itself can be configured modular, whereby even greater flexibility can be achieved with respect to adapting the tool holder 1d with respect to its length adjustment.

Figure 6:
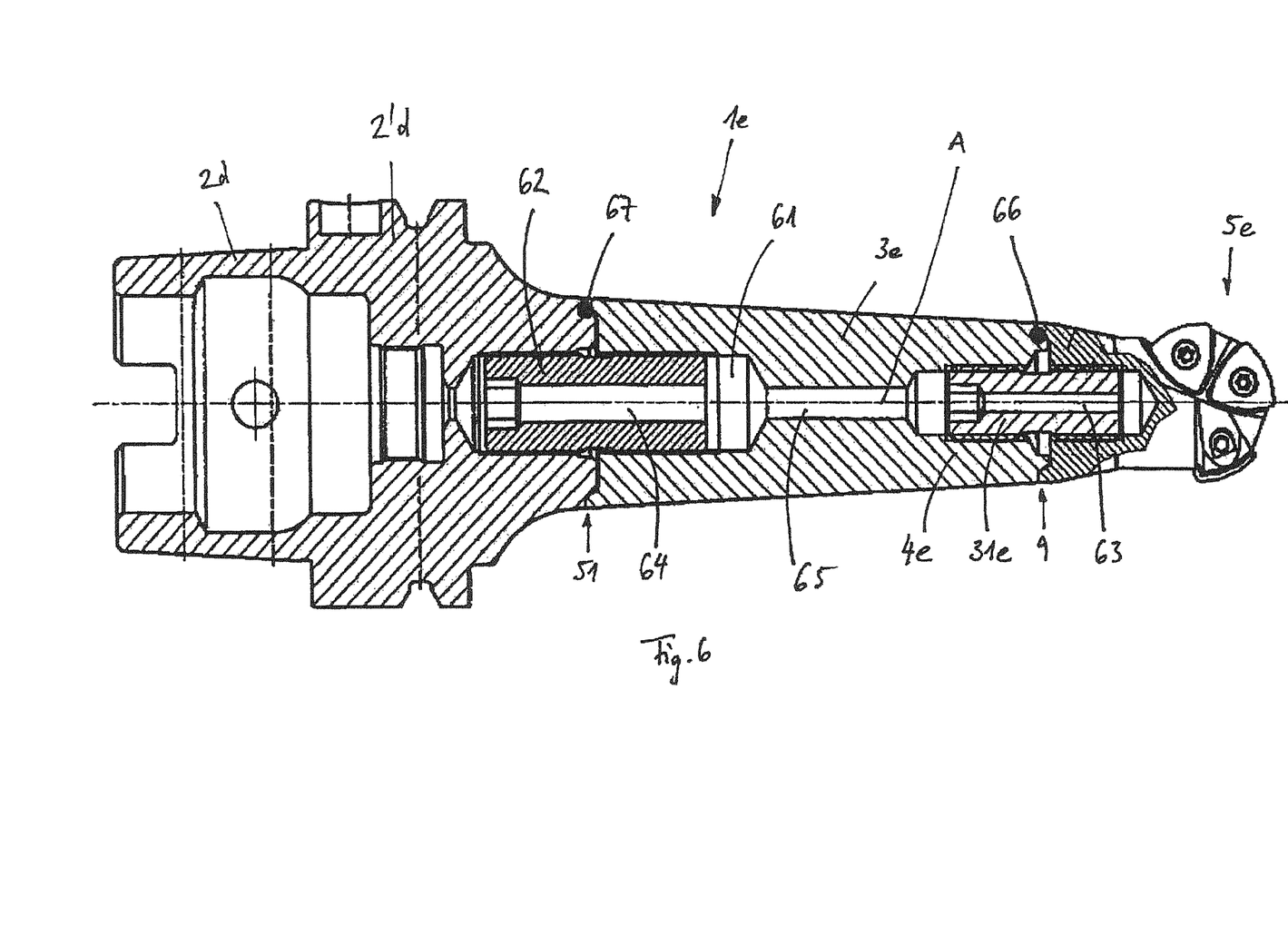
FIG. 6 shows a sectional view of a sixth embodiment of the tool holder according to the invention.

FIG. 6 shows a sixth embodiment of the tool holder 1e according to the invention in a purely schematic sectional view. Different from the tool holder 1e of FIG. 5, said modular tool holder 1e comprises a chuck 3e, which is integrally connected to the tool receiver 4e, and which comprises a receiver bore hole 61 for receiving a threaded pin 62 for connecting the chuck 3e and the center component 2'd. Here, the tool 5e is also connected to the tool receiver 4e through a threaded pin 31e. Both threaded pins 31e, 61 comprise central channels 63, 64, so that coolant can be fed to the tool 5e through the channel 65 of the chuck 3e. The interfaces 9, 51 are secured by rotation safeties 66, 67, so that the tool 5e can be loaded in both rotational directions with reference to the longitudinal axis A of the tool holder 1e, without disengaging or overloading the connections between the modules 2'd, 3e, 4b and the tool 5e. The rotation safeties 66, 67 are configured, so that for example one spherical protrusion each is respectively integrally configured at the center component 2'd and the tool receiver 4e, which engages in clamped condition of the tool holder 1e respective ball shaped recesses in the chuck 3e and in the tool 5e through form locking. Due to the threaded pins 31e and 62, the tool 5e and the modules, chuck 3e and center component 2'd, do not have to be rotated against one another, when the tool holder 1e is clamped.

Figure 7:
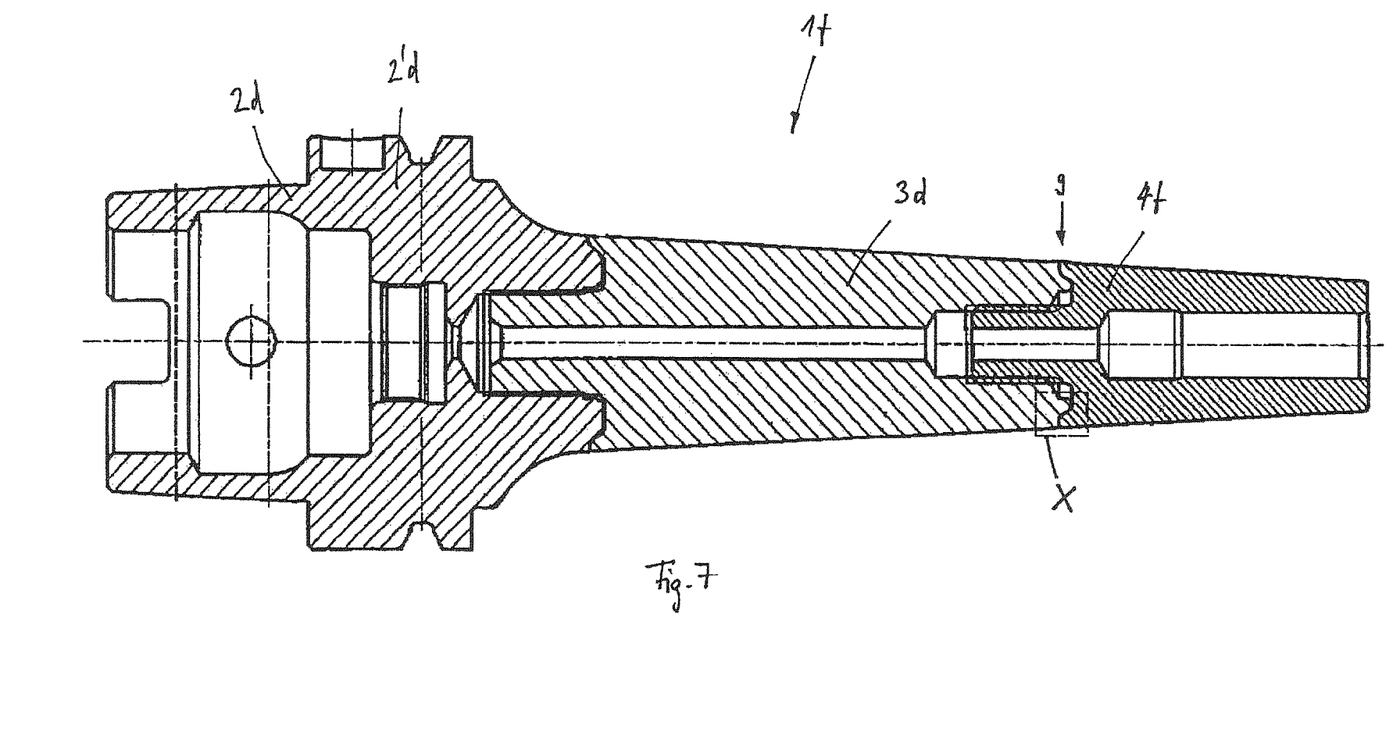
FIG. 7 shows a sectional view of a seventh embodiment of the tool holder according to the invention.

FIG. 7 illustrates a schematic sectional view of a seventh embodiment of the tool holder if according to the invention. Said tool holder if differs from the tool holder 1d according to FIG. 5 only in the respect that the tool receiver 4f is not integrally connected to the chuck 3d, but configured as a modular shrink fit chuck for a tool to be received. It is particularly advantageous for the tool receiver 4f as a shrink fit chuck that the modules tool receiver 4f and chuck 3d cannot clamp relative to one another due to the centering interface 9, this means they cannot tilt relative to one another when the shrink fit chuck is heated up.

Figure 8:
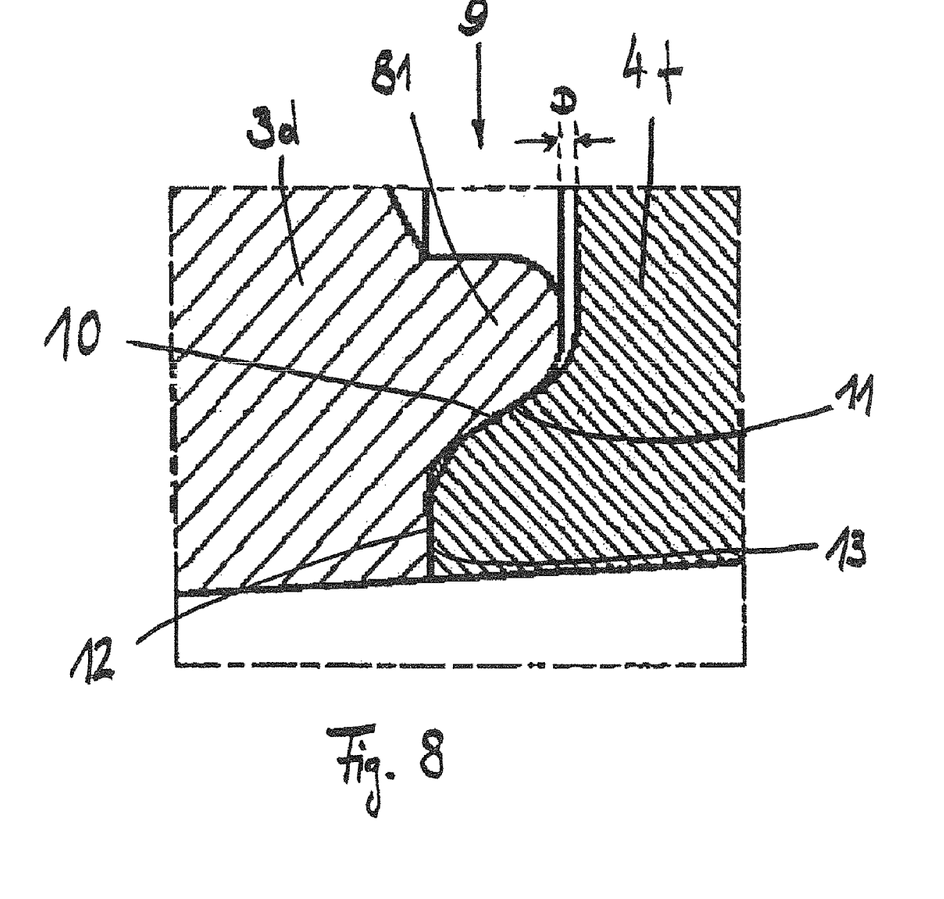
FIG. 8 shows a sectional view of a detail of the interface between center component and tool receiver of the tool holder according to FIG. 7.

FIG. 8 shows an enlarged sectional view of the detail of the interface 9 designated with X in FIG. 7. The support surface sections 10, 12 and the opposite surface sections 11, 13 of the interface 9 of the chuck 3d and of the tool receiver 4f are clearly visible. It is furthermore evident that in completely axially clamped state of chuck 3d and the tool receiver 4f between the centering element 81 of the chuck 3d, at which the support surface 10 is disposed, and the tool receiver 4f a distance D in axial direction exists. It is thus assured that the axial stop is always only defined by the support surface sections 12 and the opposite surface sections also during different thermal expansions of the chuck 3d and the tool receiver 4f, which causes a high repeatability of the centering of the interface 9. Furthermore, thereby also a possible axial clamping of the tool receiver 4f in outward direction is defined in a repeatable manner.

Figure 9:
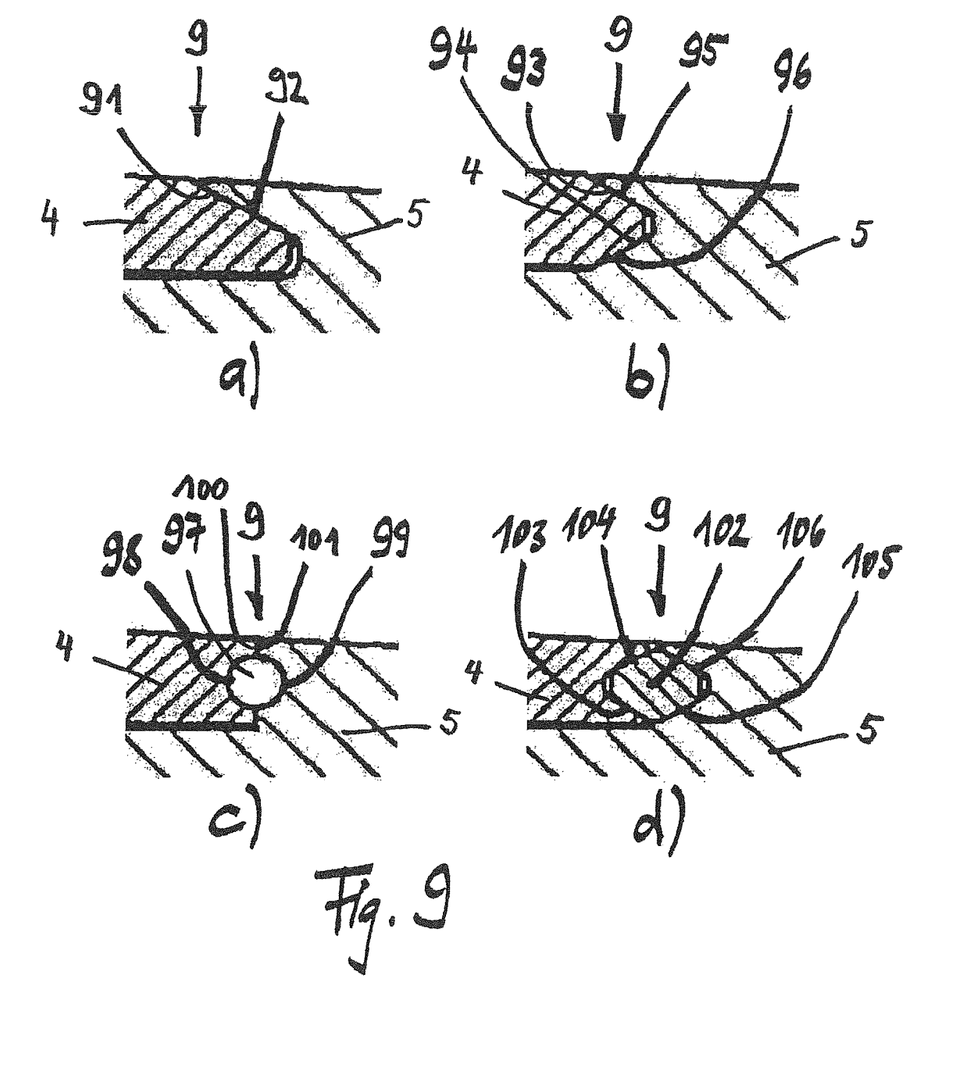

In FIG. 9a)-d), according to the tool holder 1 according to FIG. 1, differently configured interfaces 9 between the modules tool receiver 4 and tool 5 are shown in clamped condition in a purely schematic sectional view.

The interface 9 in FIG. 9a) comprises a conical support surface section 91, which partially reaches behind a conically opposed opposite surface section 92 in axial direction.

FIG. 9b) illustrates two support surface sections 93, 94, configured as conically inverse annular surfaces, which partially reach behind the two opposite surface sections 95, 96 in axial direction, which are configured as conically opposed annular surfaces.

In FIG. 9c), the interface 9 comprises balls 97, which are enclosed by support surface sections 98, as well as by the opposite surface sections 99. Furthermore, a planar seat between the support surface sections 100 and the opposite surface sections 101 is configured. Instead of the planar seat, a solely partial enclosure of the balls 97 by the support surface sections 98 and opposite surface sections 99 can also be provided. Furthermore, also a single centering ring with circular cross section can be provided instead of the particular balls 97, or such a centering ring is integrally connected with the tool receiver 4, so that the tool receiver 4 directly engages the opposite surface sections 99 of the tool 5.

FIG. 9d) eventually illustrates an interface 9, which comprises a diamond shaped centering ring 102, at which the support surface sections 103, 104 and the opposite surface sections 105, 106 contact, which are respectively configured as conically opposed annular surfaces. Also, here a planar seat is provided again.

Figure 10:
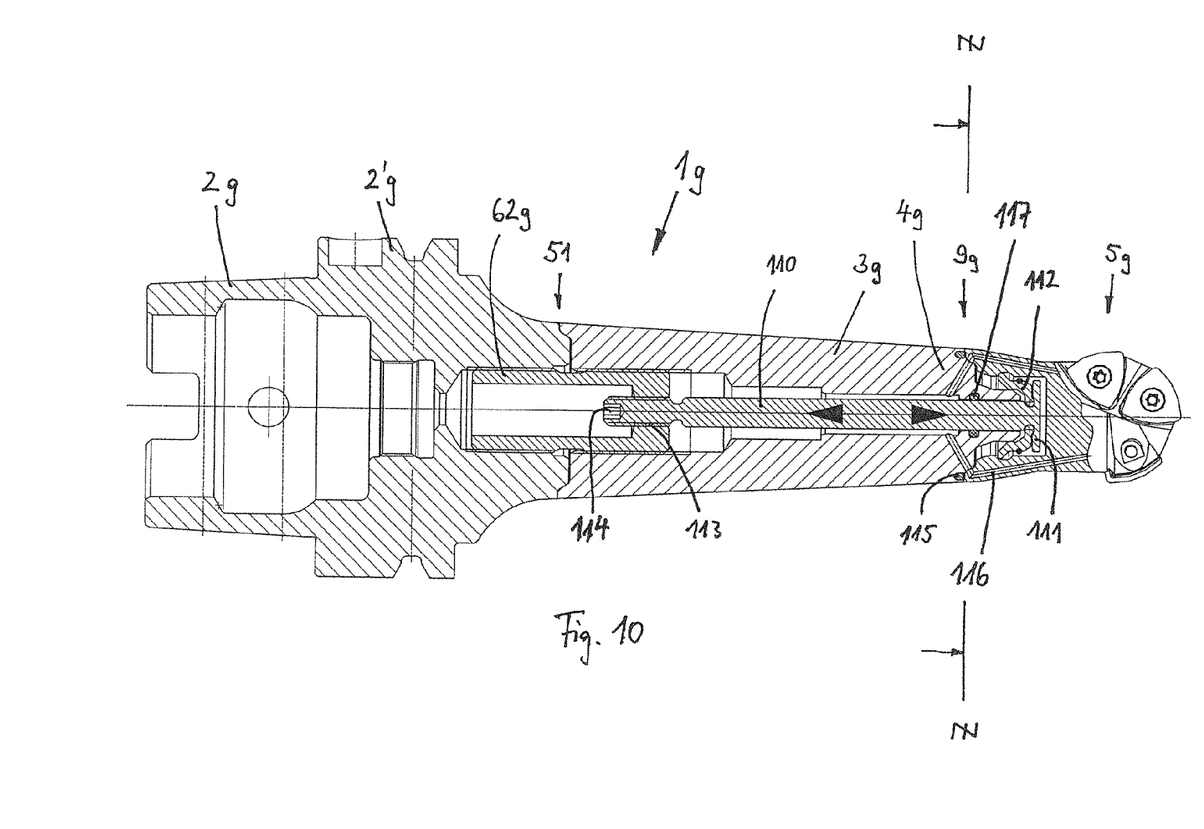
FIG. 10 shows a sectional view of an eighth embodiment of the tool holder according to the invention.

FIG. 10 illustrates a schematic sectional view of an eighth embodiment of the tool holder 1g according to the invention. Like in FIG. 6, the connection of chuck 3g and center component 2'g is performed through a threaded pin 62g. A clamping system is provided for disengageably connecting the tool 5g with the tool receiver 4g, wherein said clamping system is comprised of a tension piece 110 with a tension disk 111 mounted thereto and an expanded head collet 112. The tension piece 110 engages the threaded pin 62g through a threaded connection 113 and can be clamped relative to said threaded pin by rotation by means of a wrench (not shown) engaging a hexagonal recess 114. Due to the clamping, the clamping disk 111 presses onto the expanded head collet, which expands and clamps the tool 5g relative to the tool receiver 4g.

The interface 9g is dampened by a ring made of soft material, like e.g. plastic or lead, which is received in an annular groove, so that the soft material cannot be pressed out in lateral direction.

The coolant for the tool 5g is run through lateral bore holes 116, which directly lead through the contact surfaces of the interface 9g, so that they are certainly tight. The tension piece 110 is sealed relative to the tool receiver 4g by an O-ring 117. The coolant is thus either run from the coupling shaft 2g centrally through the tension piece 110, which is provided with lateral outlets (not shown), or it is run through bore holes in the threaded pin 62g (not shown). Alternatively, a central coolant supply according to FIG. 6 can certainly be provided.

Figure 11:
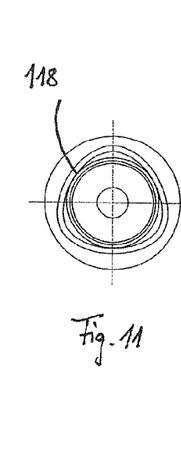
FIG. 11 shows a sectional view of a detail of the interface between tool receiver and tool of the tool holder according to FIG. 10 in the sectional plane Z-Z.

In FIG. 11, the interface 9g along the section line Z-Z is shown in more detail. It is clearly visible that the contour 118 of the interface 9g is configured polygon shaped for better torque transfer. The polygon shaped contour 118 can be provided in all interfaces according to the invention.

Figure 12:
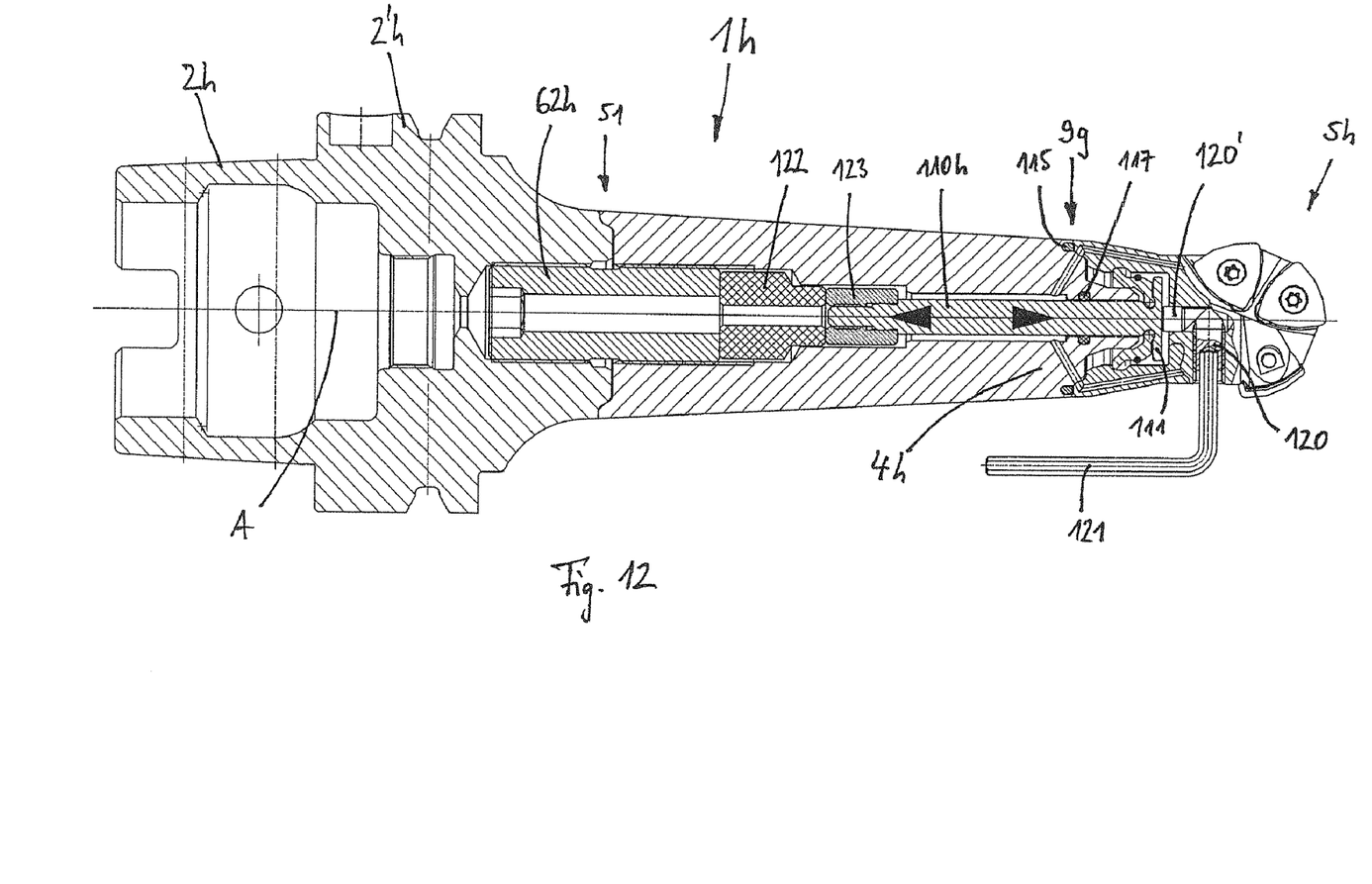
FIG. 12 shows a sectional view of a ninth embodiment of the tool holder according to the invention.
Figure 13:
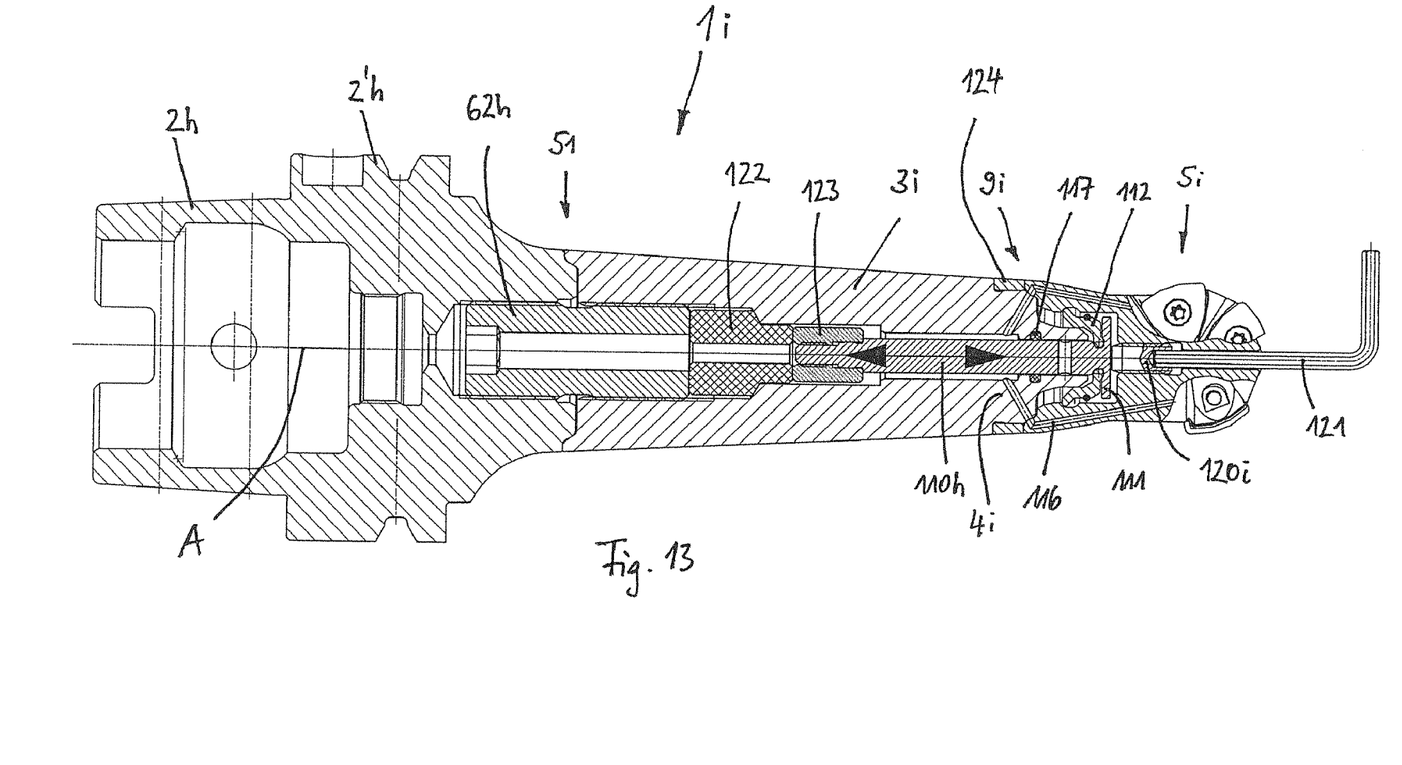
FIG. 13 shows a sectional view of a tenth embodiment of the tool holder according to the invention.

In FIGS. 12 and 13, different configurations of the clamping system of FIG. 10 are depicted for a ninth and tenth embodiment of the tool holder 1h, 1i according to the invention. Herein no threaded connections 113 to the threaded pin 62h, which is in operative engagement with the coupling shaft 2h, are provided, but a direct actuation of the tension disk 111 is provided.

In FIG. 12 a clamping force is imparted onto the tension disk 111 through a tension bolt 120, which acts upon a compression piece 120', which is provided with a conical seat surface for the tension disk 120. The tension disk 120 is thus guided transversally to the tool holder longitudinal axis A through the tool 5h. It is evident in FIG. 13 that the tension bolt 120i is disposed along the longitudinal axis A of the tool holder in the tool 5i and directly acts upon the tension disk 111. A preloading of the tension disk 111 and thus of the tool 5h, 5i relative to the tool receiver 4h, 4i is respectively performed through screwing the tension bolt 120, 120i in with a wrench 121. In order to disengage the clamped connection, a pressure rubber 122 or a spring or similar are provided, which act upon a clamping nut 123 provided at the tension piece 110.

The reversal force of the compression rubber 122 can be adjusted by adjusting the clamping nut 123 relative to the tension piece 110.

Eventually, FIG. 13 illustrates another alternative embodiment of the vibration damper of FIGS. 11 and 12. Here a ring 124 made of a high strength material, like steel, ceramic, copper or brass or similar, is provided. Therefore, the ring does not have to be supported in outward direction.

The description given supra has made it evident that the tool holder according to the invention 1, 1a, 1b, 1c, 1d, 1e, 1f, 1g, 1h, 1i provides a tool holder system with a variety of applications, which is modular in particular, relatively simple and inexpensive to produce, while still providing a high degree of centering and thus concentricity.

The invention claimed is:

1. A tool holder for tools, in particular for drilling-, turning-, milling-, reaming- or grinding tools, comprising
a longitudinal tool holder axis; and
a shaft for coupling the tool holder to a machine tool,
wherein with reference to the longitudinal axis, a center component is adjacent to the coupling shaft, a chuck is adjacent to the center component, and the chuck comprises a tool receiver, to which a tool can be disengageably connected,
wherein the tool holder is configured from modules, and at least a first module is disengageably connected to a second module, which is adjacent with respect to the longitudinal axis of the tool holder in the direction of the coupling shaft, and wherein respectively between the modules disengageably connected among one another, a centering interface is provided, which is formed by one or plural support surface sections, which are integrally disposed at the second module, which are supported at one or plural opposite surface sections, which are integrally configured at the first module,
wherein at least one of the interfaces is configured, so that the first module is not radially clamped relative to the second module, or at least clamped in radially outward direction,
wherein at least at one interface, a planar seat and/or a conical seat is provided proximal to the outer diameter of the tool holder,
wherein the planar seat is configured between contact surfaces extending orthogonal to the longitudinal axis of the tool holder, or the conical seat is configured between contact surfaces extending at an angle to the longitudinal axis of the tool holler.

2. A tool holder according to claim 1, wherein at least one support surface section is inclined with reference to the radius of the tool holder at an angle greater than 0° and smaller than 180°, relative to the longitudinal axis, and is in direct contact with one of the opposite surface sections of the interface.

3. A tool holder according to claim 1, wherein the chuck and the tool holder receiver form modules, which are directly disengageably connected among one another.

4. A tool holder according to claim 1, wherein the center piece and the chuck form modules, which are directly disengageably connected among one another.

5. A tool holder according to claim 4, wherein the chuck in addition to the tool receiver is formed from additional particular, directly disengageably connected modules.

6. A tool holder according to claim 1, wherein the centering of at least one interface is performed proximal to the exterior diameter of the tool holder, and the centering is disposed in particular, with reference to the radius of the tool holder at the interface between the half radius and the outer diameter of the tool holder.

7. A tool holder according to claim 1, wherein the planar seat and the conical seat are provided with reference to the radius of the tool holder at the interface between the half radius and the outer diameter of the tool holder.

8. A tool holder according to claim 1, wherein at least at one interface a support surface section comprises the shape of a conical annular surface, wherein in particular, another support surface section is provided, which is configured as a conical opposed annular surface, wherein the support surface sections reach behind the opposite surface sections at least in axial direction.

9. A tool holder according to claim 1, wherein at least at one interface a support surface section comprises the shape of a semispherical annular groove or of an annular protrusion, and the opposite surface section is formed by a semispherical annular protrusion or by a annular groove, or the support surface section as well as the opposite surface section comprise the shape of a semispherical annular groove, and balls are disposed between the support surface section and the opposite surface section.

10. A tool holder according to claim 1, wherein at least one interface comprises a centering ring.

11. A tool holder according to claim 10, wherein the centering ring comprises a circular cross section and the support surface section and the opposite surface section comprises the shape of a semispherical annular groove.

12. A tool holder according to claim 10, wherein the centering ring comprises a diamond shaped cross section and the support surface sections and the opposite surface sections are respectively configured by two conically opposed annular support surfaces.

13. A tool holder according to claim 1, wherein at least in one portion of the interface, between the support surface sections and the opposite surface sections of the interface, a vibration damper is disposed, wherein the vibration damper is preferably configured as a ring made of soft material, like plastic or lead, and is disposed in a recess in the planar seat.

14. A tool holder according to claim 1, wherein at least one interface comprises a rotation safety.

15. A tool holder according to claim 1, wherein the interface is provided with a polygon shaped contour for force transmission.

16. A tool holder according to claim 1, wherein the disengageable connection is a threaded connection at least at one interface, wherein at least one of the disengageable first or second modules comprises a receiver bore hole with an inner thread, in which an outer thread engages through form locking.

17. A tool holder according to claim 16, wherein the outer thread is disposed at a freely rotatable bolt with a cylindrical head, which contacts the adjacent second or first module with its head.

18. A tool holder according to claim 16, wherein the outer thread is disposed on a threaded pin, which comprises another outer thread, which engages the inner thread of a receiver bore hole in the adjacent second or first module through form locking.

19. A tool holder according to claim 18, wherein the outer threads of the threaded pin run in different directions and with different pitches, run in different directions with identical pitch, or run in the same direction with a different pitch.

20. A tool holder according to claim 1, wherein the disengageable connection at least at one interface is established through a clamping system, which is comprised of a tension piece with a tension disk and an expanded head collet, wherein the expanded head collet clamps a module relative to the other module of the interface when the tension piece is actuated by the tension disk.

21. A tool holder according to claim 20, wherein the tension piece can be actuated through engagement by the coupling shaft, wherein in particular, an outer thread disposed at the tension piece engages a respective inner thread, which is in operative engagement with the coupling shaft.

22. A tool holder according to claim 20, wherein the tension piece can be actuated by the tool through engagement along or transversal to the tool holder longitudinal axis, wherein in particular, a pressure piece is provided which acts upon the tension disk, wherein the pressure piece is actuated through a tension bolt.

23. A tool holder for tools, in particular for drilling, turning, milling, reaming or grinding tools,
    comprising a longitudinal tool holder axis, and
    a shaft for coupling the tool holder to a machine tool,
    wherein with reference to the longitudinal axis, a center component is adjacent to the coupling shaft, a chuck is adjacent to the center component, and the chuck comprises a tool receiver, to which a tool can be disengageably connected,
    wherein one or plural support surface sections are integrally configured at the tool receiver, which are supportable at one or plural opposite surface sections integrally configured at a tool, thus forming the centering interface disposed between the tool holder and the tool together with the opposite surface sections of the received tool,
    wherein the tool holder is configured substantially integral or modular according to one of the preceding claims,
    wherein the interface between the tool and the tool holder is configured according to claim 1.

24. A system, comprising a tool holder according to claim 1, and a tool, in particular, a drilling, turning, milling, reaming or grinding tool, as a disengageable module.

* * * * *